(12) United States Patent
Bertoldi et al.

(10) Patent No.: US 10,603,866 B2
(45) Date of Patent: Mar. 31, 2020

(54) HYBRID DIMPLE-AND-VOID AUXETIC STRUCTURES WITH ENGINEERED PATTERNS FOR CUSTOMIZED NPR BEHAVIOR

(71) Applicants: President and Fellows of Harvard College, Cambridge, MA (US); Siemens Canada Limited, Oakville (CA)

(72) Inventors: Katia Bertoldi, Somerville, MA (US); Fabian Enrique Sanchez Guerrero, Montreal (CA); Farhad Javid, Somerville, MA (US); François Jette, Longueuil (CA); Minh Quan Pham, Saint-Laurent (CA); Megan Schaenzer, Montreal (CA); Ali Shanian, Montreal (CA)

(73) Assignees: President and Fellows of Harvard College, Cambridge, MA (US); Siemens Canada Limited, Oakville (CA)

( * ) Notice: Subject to any disclaimer, the term of this patent is extended or adjusted under 35 U.S.C. 154(b) by 256 days.

(21) Appl. No.: 15/542,612

(22) PCT Filed: Jan. 9, 2016

(86) PCT No.: PCT/US2016/012768
§ 371 (c)(1),
(2) Date: Jul. 10, 2017

(87) PCT Pub. No.: WO2016/112367
PCT Pub. Date: Jul. 14, 2016

(65) Prior Publication Data
US 2018/0264774 A1 Sep. 20, 2018

Related U.S. Application Data

(60) Provisional application No. 62/118,823, filed on Feb. 20, 2015, provisional application No. 62/101,834, filed on Jan. 9, 2015.

(51) Int. Cl.
*B32B 15/01* (2006.01)
*B32B 3/26* (2006.01)
(Continued)

(52) U.S. Cl.
CPC ............... *B32B 3/266* (2013.01); *B32B 3/30* (2013.01); *B32B 15/01* (2013.01); *C22C 19/03* (2013.01);
(Continued)

(58) Field of Classification Search
CPC .. A41D 31/00; B32B 3/10; B32B 3/30; B32B 15/01; B32B 3/12; B32B 3/26;
(Continued)

(56) References Cited

U.S. PATENT DOCUMENTS

| 3,655,501 A | 4/1972 | Tesch |
| 5,233,828 A | 8/1993 | Napoli |

(Continued)

FOREIGN PATENT DOCUMENTS

| EP | 0971172 A1 | 1/2000 |
| EP | 1533475 A2 | 5/2005 |

(Continued)

OTHER PUBLICATIONS

International Search Report and Written Opinion of International Searching Authority for PCT/US2016/012768 dated May 3, 2016 (11 pages).

(Continued)

*Primary Examiner* — Daniel J. Schleis
*Assistant Examiner* — Kevin C T Li
(74) *Attorney, Agent, or Firm* — Nixon Peabody LLP

(57) ABSTRACT

Auxetic structures, low porosity auxetic sheets, systems and devices with auxetic structures, and methods of using and methods of making auxetic structures are disclosed. An auxetic structure is disclosed which includes an elastically rigid body with a plurality of apertures extending through the elastically rigid body and a plurality of protrusions (Continued)

projecting from the elastically rigid body. The apertures and protrusions are arranged in an engineered pattern, such as an array of rows and columns. The apertures are cooperatively configured with the protrusions to provide a predefined porosity while exhibiting stress reduction through negative Poisson's Ratio (NPR) behavior under macroscopic planar loading conditions. In some embodiments, the protrusions, which are elliptical or semispherical dimples, are interposed in square or hexagonal patterns with the apertures, which are S-shaped through slots or circular boreholes.

11 Claims, 5 Drawing Sheets

(51) Int. Cl.
  *B32B 3/30* (2006.01)
  *F23R 3/00* (2006.01)
  *C22C 19/03* (2006.01)
  *F02C 7/00* (2006.01)
(52) U.S. Cl.
  CPC ............... *F02C 7/00* (2013.01); *F23R 3/002* (2013.01); *B32B 2307/51* (2013.01); *F23R 2900/03044* (2013.01); *F23R 2900/03045* (2013.01)
(58) Field of Classification Search
  CPC ....... B32B 5/18; B32B 2307/51; C22C 19/03; F02C 7/00; F23R 3/002; F23R 2900/03044; Y10T 428/24314
  See application file for complete search history.

(56) References Cited

U.S. PATENT DOCUMENTS

| | | | |
|---|---|---|---|
| 6,223,641 B1 | 5/2001 | Kang | |
| 6,237,344 B1* | 5/2001 | Lee | F01D 5/186 165/908 |
| 6,692,812 B1 | 2/2004 | Watanabe | |
| 7,186,084 B2* | 3/2007 | Bunker | F01D 5/187 416/96 R |
| 8,066,482 B2 | 11/2011 | Strohl | |
| 2007/0122590 A1 | 5/2007 | Lalvani | |
| 2009/0041978 A1 | 2/2009 | Sogard | |
| 2010/0009120 A1 | 1/2010 | Boyce | |
| 2011/0059291 A1* | 3/2011 | Boyce | C08J 5/00 428/136 |
| 2011/0081235 A1 | 4/2011 | Shah | |
| 2012/0021167 A1* | 1/2012 | Plant | A41D 13/0156 428/116 |
| 2012/0315456 A1 | 12/2012 | Scarpa | |
| 2014/0260281 A1* | 9/2014 | Innes | F23R 3/002 60/752 |

FOREIGN PATENT DOCUMENTS

| | | |
|---|---|---|
| WO | WO 2014/151045 A1 | 9/2014 |
| WO | WO 2014/197059 A1 | 12/2014 |
| WO | WO 2016/112367 A2 | 7/2016 |

OTHER PUBLICATIONS

International Search Report and Written Opinion of International Searching Authority for PCT/US2014/025324 dated Nov. 18, 2014 (6 pages).

International Search Report and Written Opinion of International Searching Authority for PCT/US2014/024830 dated Jul. 10, 2014 (11 pages).

Taylor et al., "Low Porosity Metallic Periodic Structures with Negative Poisson's Ratio"; Advanced Materials, vol. 26, No. 15, Dec. 23, 2013; pp. 2365-2370 (7 pages).

Supplementary European Search Report for EP 16 73 5530 dated Jun. 15, 2018 (8 pages).

* cited by examiner

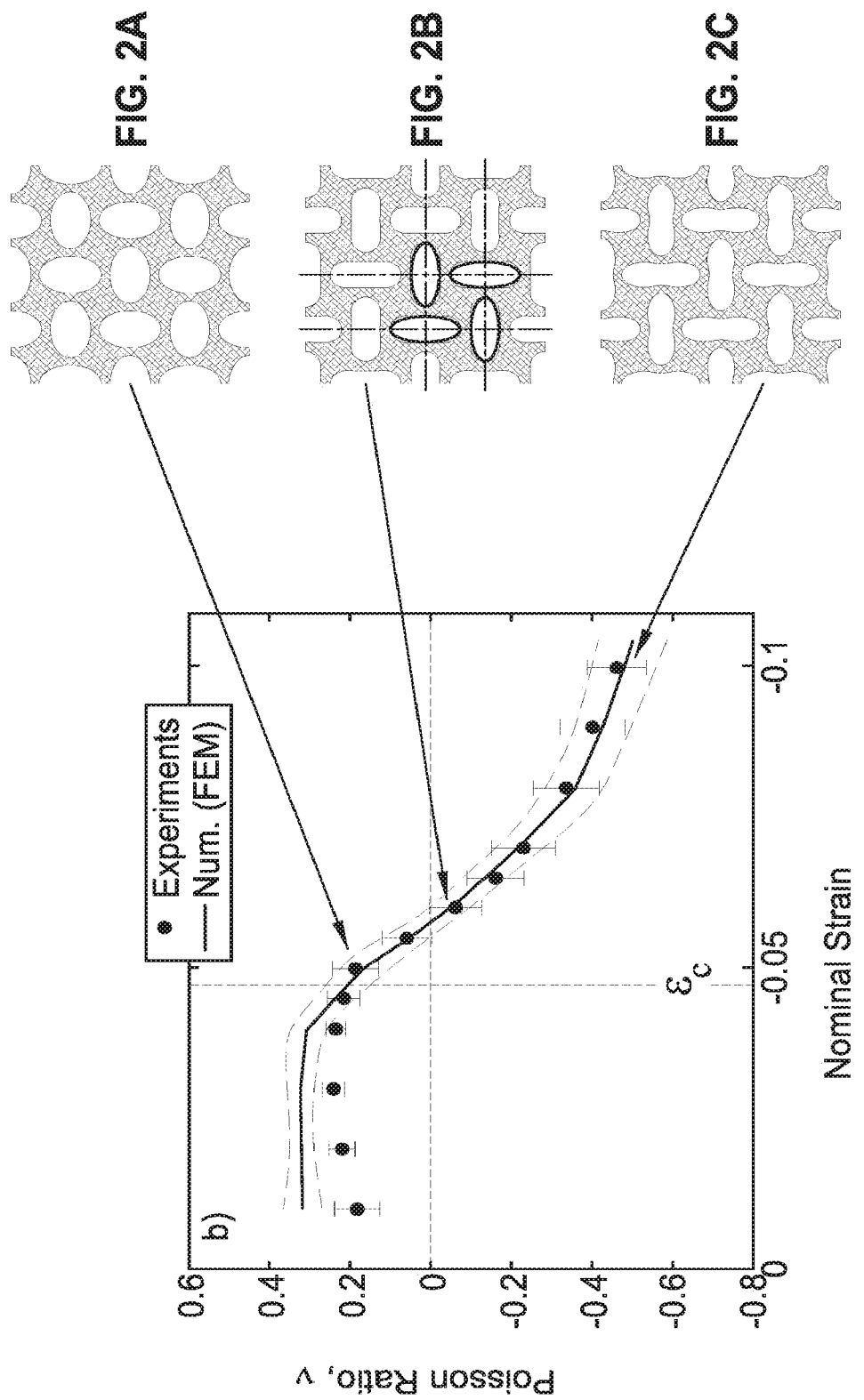

HYBRID DIMPLE-AND-VOID AUXETIC STRUCTURES WITH ENGINEERED PATTERNS FOR CUSTOMIZED NPR BEHAVIOR

CROSS-REFERENCE TO RELATED APPLICATIONS

This application is a national stage of International Application No. PCT/US2016/012768, filed Jan. 9, 2016, and titled "Hybrid Dimple-And-Void Auxetic Structures With Engineered Patterns For Customized NPR Behavior," which claims the benefit of U.S. Provisional Patent Application No. 62/118,823, filed on Feb. 20, 2015, and titled "Hybrid Dimple-And-Void Auxetic Structures With Engineered Patterns For Customized NPR Behavior," and U.S. Provisional Patent Application No. 62/101,834, filed on Jan. 9, 2015, and titled "Hybrid Dimple-Void Structures," each of which are incorporated herein by reference in their respective entireties.

TECHNICAL FIELD

The present disclosure relates generally to porous materials and cellular solids with tailored isotropic and anisotropic Poisson's ratios. More particularly, aspects of this disclosure relate to auxetic structures with engineered patterns that exhibit negative Poisson's Ratio (NPR) behavior, as well as systems, methods and devices using such structures.

BACKGROUND

When materials are compressed along a particular axis, they are most commonly observed to expand in directions transverse to the applied axial load. Conversely, most materials contract along a particular axis when a tensile load is applied along an axis transverse to the axis of contraction. The material property that characterizes this behavior is known as the Poisson's Ratio, which can be defined as the negative of the ratio of transverse/lateral strain to axial/longitudinal strain under axial loading conditions. The majority of materials are characterized by a positive Poisson's Ratio, which is approximately 0.5 for rubber, approximately 0.3 for aluminum, brass and steel, and approximately 0.2 for glass.

Materials with a negative Poisson's Ratio (NPR), on the other hand, will contract (or expand) in the transverse direction when compressed (or stretched) in the axial direction. Materials that exhibit negative Poisson's Ratio behavior are oftentimes referred to as "auxetic" materials. The results of many investigations suggest that auxetic behavior involves an interplay between the microstructure of the material and its deformation. Examples of this are provided by the discovery that metals with a cubic lattice, natural layered ceramics, ferroelectric polycrystalline ceramics, and zeolites may all exhibit negative Poisson's Ratio behavior. Moreover, several geometries and mechanisms have been proposed to achieve negative values for the Poisson's Ratio, including foams with reentrant structures, hierarchical laminates, polymeric and metallic foams. Negative Poisson's Ratio effects have also been demonstrated at the micrometer scale using complex materials which were fabricated using soft lithography and at the nanoscale with sheet assemblies of carbon nanotubes.

A significant challenge in the fabrication of auxetic materials is that it usually involves embedding structures with intricate geometries within a host matrix. As such, the manufacturing process has been a bottleneck in the practical development towards applications. A structure which forms the basis of many auxetic materials is that of a cellular solid. Research into the deformation of these materials is a relatively mature field with primary emphasis on the role of buckling phenomena, on load carrying capacity, and energy absorption under compressive loading. Very recently, the results of a combined experimental and numerical investigation demonstrated that mechanical instabilities in 2D periodic porous structures can trigger dramatic transformations of the original geometry. Specifically, uniaxial loading of a square array of circular holes in an elastomeric matrix is found to lead to a pattern of alternating mutually orthogonal ellipses while the array is under load. This results from an elastic instability above a critical value of the applied strain. The geometric reorganization observed at the instability is both reversible and repeatable and it occurs over a narrow range of the applied load. Moreover, it has been shown that the pattern transformation leads to unidirectional negative Poisson's Ratio behavior for the 2D structure, i.e., it only occurs under compression.

U.S. Pat. No. 5,233,828 ("'828 Patent") shows an example of an engineered void structure—a combustor liner or "heat shield"—utilized in high temperature applications. Combustor liners are typically used in the combustion section of a gas turbine. Combustor liners can also be used in the exhaust section or in other sections or components of the gas turbine, such as the turbine blades. In operation, combustors burn gas at intensely high temperatures, such as around 3,000° F. or higher. To prevent this intense heat from damaging the combustor before it exits to a turbine, the combustor liner is provided in the interior of the combustor to insulate the surrounding engine. To minimize temperature and pressure differentials across a combustor liner, cooling feature have conventionally been provided, such as is shown in the '828 Patent, in the form of spaced cooling holes disposed in a continuous pattern. As another example, U.S. Pat. No. 8,066,482 B2 presents an engineered structural member having elliptically-shaped cooling holes to enhance the cooling of a desired region of a gas turbine while reducing stress levels in and around the cooling holes. European Patent No. EP 0971172 A1 likewise shows another example of a perforated liner used in a combustion zone of a gas turbine. None of the above patent documents, however, provide examples disclosed as exhibiting auxetic behavior or being engineered to provide NPR effects.

U.S. Patent Application Pub. No. 2010/0009120 A1 discloses various transformative periodic structures which include elastomeric or elasto-plastic periodic solids that experience transformation in the structural configuration upon application of a critical macroscopic stress or strain. Said transformation alters the geometric pattern, changing the spacing and the shape of the features within the transformative periodic structure. Upon removal of the critical macroscopic stress or strain, these elastomeric periodic solids recover their original form. By way of comparison, U.S. Patent Application Pub. No. 2011/0059291 A1 discloses structured porous materials, where the porous structure provides a tailored Poisson's ratio behavior. These porous structures consist of a pattern of elliptical or elliptical-like voids in an elastomeric sheet which is tailored, via the mechanics of the deformation of the voids and the mechanics of the deformation of the material, to provide a negative or a zero Poisson's ratio. All of the foregoing patent documents are incorporated herein by reference in their respective entireties and for all purposes.

SUMMARY

Aspects of the present disclosure are directed towards hybrid dimple-and-void auxetic structures with engineered patterns for providing customized negative Poisson's Ratio (NPR) behavior. As an example, a sheet of rigid but elastic material is fabricated with carefully designed voids, such as elliptical, barbell-shaped, or S-shaped through slots, and carefully designed raised or recessed protrusions. These voids and protrusions are arranged in a pattern that is engineered to reduce stress under displacement loading conditions in the plane of the sheet. Stress reduction is achieved, for example, through cell rotation and as a result, gives the sheet NPR behavior. The void shapes can be optimized for minimum stress by adjusting various topological parameters. Since many shape parameters also affect the porosity of the overall structure, any stress-optimized pattern will have a fixed porosity associated therewith.

Oftentimes, when optimized for minimum stresses in displacement load conditions, patterned auxetic structures can tend toward porosities that are higher than typical targets, for example, for combustion components in gas turbines. These targets are generally between 0.3-5.0%, with certain cases reaching 9.0%, and can be critical to achieving turbine emission goals. If a porosity in this range is imposed on an auxetic structure by applying a relevant constraint in the optimization process, stress reduction is achieved with the addition of non-porous auxetic features (e.g., dimples) used in conjunction with void-patterned auxetic features (e.g., slots) to form a hybrid auxetic. This hybrid structure can achieve specific porosity values that are much lower than those achieved by auxetic structures utilizing only voids to provide commensurate NPR behavior while still achieving a stress reduction as compared to existing technology. One example of a hybrid auxetic structure employs a combination of elliptical dimples and S-shaped through slots with the same aspect ratios and arranged in a square pattern.

According to some aspects of the present disclosure, various auxetic structures are disclosed. In an example, an auxetic structure includes an elastically rigid body, such as a metallic sheet or other sufficiently elastic solid material, with a plurality of apertures extending through the elastically rigid body and a plurality of protrusions projecting from the elastically rigid body. The apertures are arranged in a first array of rows and columns, while the protrusions are arranged in a second array of rows and columns. The apertures are cooperatively configured with the plurality of protrusions to provide a predefined porosity while exhibiting stress reduction through negative Poisson's Ratio (NPR) behavior under macroscopic planar loading conditions, e.g., through cellular rotation and stress reduction characteristic of such NPR structures. For some configurations, the protrusions, which are elliptical or semispherical dimples, are interposed in square or hexagonal patterns with the apertures, which are S-shaped through slots or circular boreholes.

In accordance with other aspects of this disclosure, low porosity auxetic sheet structures are disclosed. In an example, a low porosity auxetic sheet structure is presented which includes a metallic sheet with a plurality of voids extending through the metallic sheet and a plurality of dimples projecting from the metallic sheet. The voids, which have a first set of geometric characteristics, such as a width, radius, aspect ratio, and/or a curvature, are arranged in a first pattern. The dimples, which have a second set of geometric characteristics, such as an aspect ratio and/or depth, are arranged in a second pattern. The geometric characteristics and pattern of the voids are cooperatively configured with the geometric characteristics and pattern of the dimples to provide a predefined porosity while exhibiting stress reduction through negative Poisson's Ratio (NPR) behavior under macroscopic planar loading conditions.

Other aspects of the present disclosure are directed to methods of manufacturing and methods of using auxetic structures. In an example, a method is presented for manufacturing an auxetic structure. Said method includes: providing an elastically rigid body; adding to the elastically rigid body a plurality of apertures extending through the elastically rigid body, the plurality of apertures being arranged in a first array of rows and columns; and adding to the elastically rigid body a plurality of protrusions projecting from the elastically rigid body, the plurality of protrusions being arranged in a second array of rows and columns, wherein the plurality of apertures are cooperatively configured with the plurality of protrusions to provide a predefined porosity while exhibiting stress reduction through negative Poisson's Ratio (NPR) behavior under macroscopic planar loading conditions. The elastically rigid body may take on various forms, such as a metallic sheet or other sufficiently elastic solid material. For some configurations, the protrusions, which are elliptical or semispherical dimples, are interposed in square or hexagonal patterns with the apertures, which are S-shaped through slots or circular boreholes.

According to other aspects of this disclosure, a method of fabricating an auxetic structure is presented. The method includes: receiving design values for predetermined design requirements of the auxetic structure; determining, from the received design values, a required component porosity and/or stiffness for the auxetic structure; determining maximum allowable stress values for the auxetic structure; determining a slot design parameter for a plurality of slots of the auxetic structure based, at least in part, on the maximum allowable stress values and the required component porosity/stiffness; determining a dimple design parameter for a plurality of dimples of the auxetic structure based, at least in part, on the maximum allowable stress values and the required component porosity/stiffness; determining a unit cell arrangement for the slots and the dimples based, at least in part, on the maximum allowable stress values and the required component porosity/stiffness; and adding to an elastically rigid body the plurality of slots and dimples in accordance with the determined slot design parameter, the determined dimple design parameter and the determined unit cell arrangement.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, which are considered to be inventive singly and in any combination, will be readily apparent from the following detailed description of representative embodiments and modes for carrying out the present disclosure when taken in connection with the accompanying drawings and the appended claims.

BRIEF DESCRIPTION OF THE DRAWINGS

FIG. 1 is a graph of Nominal Strain vs. Poisson's Ratio illustrating the Poisson's Ratio behavior of representative structures with elongated through holes according to aspects of the present disclosure.

FIGS. 2A-2C are illustrations of the representative structures of FIG. 1 corresponding to specific data points from the graph.

Figure 3:
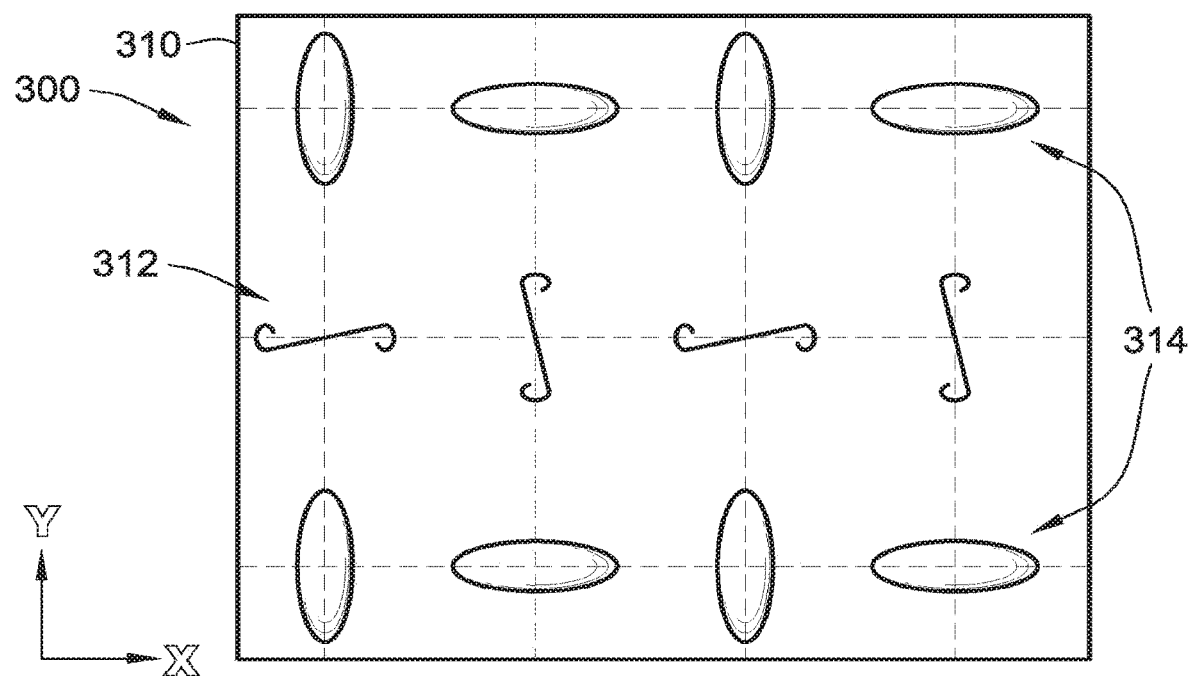
FIGS. 3 and 4 are plan-view illustrations of representative hybrid dimple-and-void auxetic structures utilizing elliptical protrusions and S-shaped through slots in accordance with aspects of the present disclosure.

The present disclosure is susceptible to various modifications and alternative forms, and some representative embodiments have been shown by way of example in the drawings and will be described in detail herein. It should be understood, however, that the inventive aspects of this disclosure are not limited to the particular forms illustrated in the drawings. Rather, the disclosure is to cover all modifications, equivalents, combinations and subcombinations, and alternatives falling within the spirit and scope of the invention as defined by the appended claims.

DETAILED DESCRIPTION OF THE ILLUSTRATED EMBODIMENTS

This disclosure is susceptible of embodiment in many different forms. There are shown in the drawings, and will herein be described in detail, representative embodiments with the understanding that the present disclosure is to be considered as an exemplification of the principles of the present disclosure and is not intended to limit the broad aspects of the disclosure to the illustrated embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed or logically prohibited: the singular includes the plural and vice versa; and the words "including" or "comprising" or "having" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Aspects of the present disclosure are directed towards hybrid dimple-and-void auxetic structures which include repeating aperture and protrusion patterns that provide negative Poisson's Ratio (NPR) behavior when macroscopically loaded. Poisson's Ratio (or "Poisson coefficient") can be generally typified as the ratio of transverse contraction strain to longitudinal extension strain in a stretched object. Poisson's Ratio is typically positive for most materials, including many alloys, polymers, polymer foams and cellular solids, which become thinner in cross section when stretched. The auxetic structures disclosed herein exhibit a negative Poisson's Ratio behavior.

According to aspects of the disclosed concepts, when the auxetic structure is compressed along one axis (e.g., in the Y-direction), coaxial strain results in a moment around the center of each cell because of the way the adjacent apertures are arranged. This, in turn, causes the cells to rotate. Each cell rotates in a direction opposite to that of its immediate neighbors. This rotation results in a reduction in the transverse axis (X-direction) distance between horizontally adjacent cells. In other words, compressing the structure in the Y-direction causes it to contract in the X-direction. Conversely, tension in the Y-direction results in expansion in the X-direction. At the scale of the entire structure, this mimics the behavior of an auxetic material. But many of the structures disclosed herein are composed of conventional materials. Thus, the unadulterated material itself may have a positive Poisson's Ratio, but by modifying the structure with the introduction of the aperture-and-protrusion patterns disclosed herein, the structure behaves as having a negative Poisson's Ratio.

FIG. 1 is a graph of Poisson's Ratio (PR) against Nominal Strain illustrating the Poisson's Ratio behavior of three representative void structures shown in FIGS. 2A-2C. The chart of FIG. 1 shows the Poisson's Ratio of each test piece under load. At a certain level of deformation, the "instantaneous" PR can be determined and plotted against a parameter (e.g., nominal strain) representing the level of deformation. When a designer has a desired NPR for an intended application, the level of deformation corresponding to that PR can be determined and the geometry of the holes at that condition determined. This hole shape pattern can then be machined (manufactured) on an unstressed part to achieve a component with the desired PR.

As seen in FIGS. 2B and 2C, the NPR aperture patterns can consist of horizontally and vertically oriented, elongated holes (also referred to as "apertures" or "voids" or "slots"), shown as elliptical through slots. These elongated holes are arranged on horizontal and vertical lines (e.g., rows and columns of a square array in FIG. 2B) in a way that the vertical lines are equally spaced and the horizontal in both dimensions lines are equally spaced (also $\Delta x = \Delta y$). The center of each slot is on the crossing point of two of the lines. Horizontally oriented and vertically oriented slots alternate on the vertical and horizontal lines such that any vertically oriented slot is surrounded by horizontally oriented slots (and vice versa), while the next vertically oriented slots are found on both diagonals. These voids can also act as cooling and/or damping holes and, due to their arrangement, also as stress reduction features. As discussed herein, one or more of the slots shown in FIGS. 2B and 2C can be replaced by similarly shaped dimples (also referred to herein as "protrusions" or "projections").

Also disclosed is a gas turbine combustor that is made with walls from a material with any of the specific auxetic structure configurations disclosed herein. In some embodiments, the aperture and protrusion shapes are generated in a metal body directly in a stress-free state such that the apertures are equivalent in shape to collapsed void shapes found in rubber under external load in order to get NPR behavior in the metal body without collapsing the metallic structure in manufacturing. Various manufacturing routes can be used to replicate the void patterns in the metallic component. The manufacturing does not necessarily contain buckling as one of the process steps. The auxetic structures disclosed herein are not limited to the combustor wall; rather, these features can be incorporated into other sections of a turbine (e.g., a blade, a vane, etc.).

In a conventional combustor wall, holes used for cooling air flow and damping also act as stress risers. In some of the disclosed embodiments, as the wall material at a hot spot presses against its surrounding material, e.g., in a vertical direction, the negative Poisson's Ratio will make the wall material contract in the horizontal direction, and vice versa. This behavior will reduce the stresses at the hotspot significantly. This effect is stronger than just the impact of the reduced stiffness. Stress at hot spot gets reduced, for example, by 50% which, in turn, leads to an increase in stress fatigue life by several orders of magnitude. The stress reduction by the NPR behavior does not increase the air consumption of the combustor wall. The longer life could be used as such or the wall material could be replaced by a cheaper one in order to reduce raw material costs.

It has also been demonstrated that the replacement of circular combustor cooling holes with a fraction of elongated/elliptical air passages of 2-3% reduces thermo-mechanical stress by a factor of at least five, while maintaining the cooling and damping performance. For example, elliptical cooling holes in the combustor have been predicted to result in a five-fold decrease in the worst principal stress. Inducing NPR behavior, thus, adds further functionality to the cooling holes of the combustor in that the NPR behavior generates a five-fold reduction in worst principal stress as compared to traditional cooling holes. In stress fatigue of a combustor-specific superalloy, halving the component stress increases the fatigue life by more than an order of magnitude. In some embodiments, the superalloy may be a nickel-based superalloy, such as Inconel (e.g. IN100, IN600, IN713), Waspaloy, Rene alloys (e.g. Rene 41, Rene 80, Rene 95, Rene N5), Haynes alloys, Incoloy, MP98T, TMS alloys, and CMSX (e.g. CMSX-4) single crystal alloys.

It has been shown that optimized porosity offers increased cooling function. As used herein, "porosity" can be defined to mean the surface area of the apertures, $A_A$, divided by the surface area of the structure, $A_S$, or Porosity=$A_A/A_S$. It may be desirable, in some embodiments, that the porosity of a given void structure be approximately 0.3-9% or, in some embodiments, approximately 1-4% or, in some embodiments, approximately 2%. By comparison, many prior art arrangements require a porosity of 40-50%.

There may be a predetermined optimal aspect ratio for the elongated apertures to provide a desired NPR behavior. As used herein, "aspect ratio" of the apertures can be defined to mean the length divided by the width of the apertures, or the length of the major axis divided by the length of the minor axis of the apertures. It may be desirable, in some embodiments, that the aspect ratio of the apertures be approximately 5-40 or, in some embodiments, approximately 20-30. An optimal NPR can be, for example, −0.5. Aspects of the disclosed concepts can be demonstrated on structural patterns created with a pattern lengthscale at the millimeter, and are equally applicable to structures possessing the same periodic patterns at a smaller lengthscale (e.g., micrometer, submicrometer, and nanometer lengthscales) or larger lengthscales so far as the unit cells fit in the structure.

Turning next to FIGS. 3-9, there are shown various examples of hybrid dimple-and-void auxetic structures which exhibit NPR behavior in accordance with the present disclosure. FIG. 3, for example, illustrates a hybrid dimple-and-void auxetic structure, designated generally at 300, which utilizes an alternating pattern of elongated symmetrical protrusions and an alternating pattern of elongated asymmetrical slots. The foregoing protrusions and slots are elongated in that each has a major axis (e.g., a length) that is larger than and perpendicular to a minor axis (e.g., a width). As shown, the auxetic structure 300 comprises an elastically rigid body 310, which may be in the form of a metallic sheet or other rigid body with sufficient elasticity to return substantially or completely to its original form once macroscopic loading conditions are reduced or eliminated. Fabricated into the elastically rigid body 310 is a plurality of S-shaped through slots (or "apertures"), collectively designated as 312, which extend through the elastically rigid body 310. The elongated apertures are present in the elastically rigid body 310 when in a stress-free state. In addition, a plurality of elliptical protrusions (or "dimples"), collectively designated as 314, project from the surface of the elastically rigid body 310. While shown comprising only raised protrusion, the auxetic structure 300 can be fabricated with one or more raised protrusions and one or more recessed protrusions.

S-shaped through slots 312 are arranged in rows and columns (e.g., in a first array or matrix); likewise, elliptical protrusions 314 are arranged in rows and columns (e.g., a second array or matrix). In the embodiment of FIG. 3, the rows of S-shaped through slots 312 are interleaved with the rows of elliptical protrusions 314 (e.g., a row consisting entirely of slots is neighbored above and below by rows consisting entirely of protrusions, and vice versa). Moreover, each of the aforesaid rows alternates between vertically oriented slots/protrusions and horizontally oriented slots/protrusions. For example, each vertically oriented slot is neighbored on its left and right-hand sides by horizontally oriented slots, whereas each vertically oriented protrusion is neighbored on its left and right-hand sides by horizontally oriented protrusions. With this arrangement, a first plurality of the protrusions and slots is arranged with their major axes parallel to the rows of the array, while a second plurality of the protrusions and slots is arranged with their major axes parallel to the columns of the array.

The illustrated pattern of apertures and protrusions provides a predefined porosity (e.g., about 0.3 to 9%) while exhibiting a determined negative Poisson's Ratio behavior (e.g., about −0.5 to −0.7) under macroscopic planar loading conditions (e.g., when tension or compression is applied in the plane of the sheet). When the auxetic structure 300 is stretched, for example, along a vertical axis, axial strain in the vertical direction results in a moment around the center of each cell, which causes the cells to rotate. A cell may consist of two neighboring dimples adjacent two neighboring voids. Each cell rotates in a direction opposite to that of its immediate neighboring cells. This rotation increases the X-direction distance between horizontally adjacent cells such that stretching the structure in the Y direction causes it to stretch in the X direction. The apertures have (first) engineered geometric characteristics, including a predefined porosity and a predefined aspect ratio, while the protrusions have (second) engineered geometric characteristics, including a predefined depth and a predefined aspect ratio, that are cooperatively configured with (third) engineered geometric characteristics of the aperture-and-protrusion pattern, including NPR feature density and cell arrangement, to achieve the predetermined NPR behavior under macroscopic stress and strain loadings.

Figure 6:
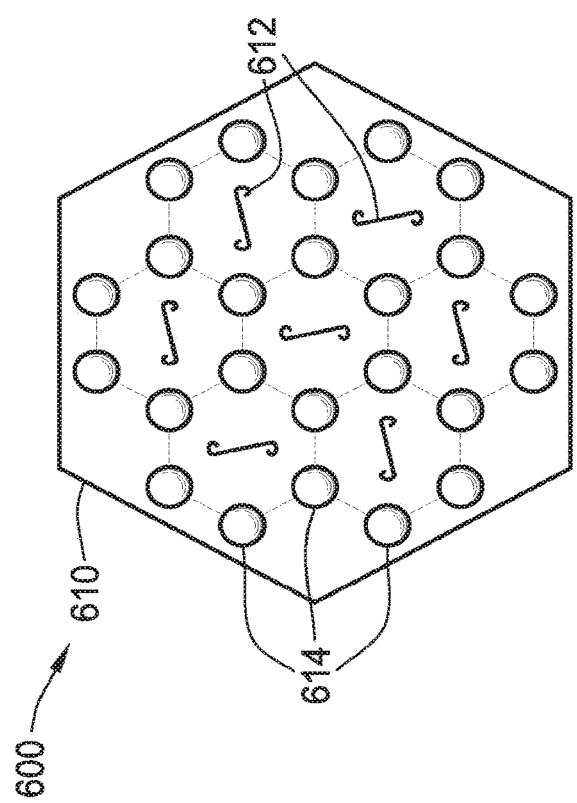
FIG. 5-7 are plan-view illustrations of representative hybrid dimple-and-void auxetic structures utilizing semi-spherical protrusions and S-shaped through slots in accordance with aspects of the present disclosure.
Figure 5:
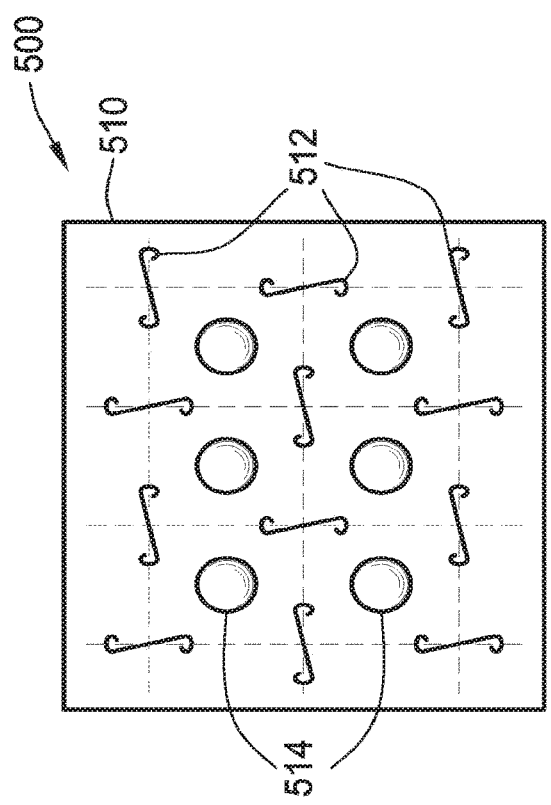
Figure 7:
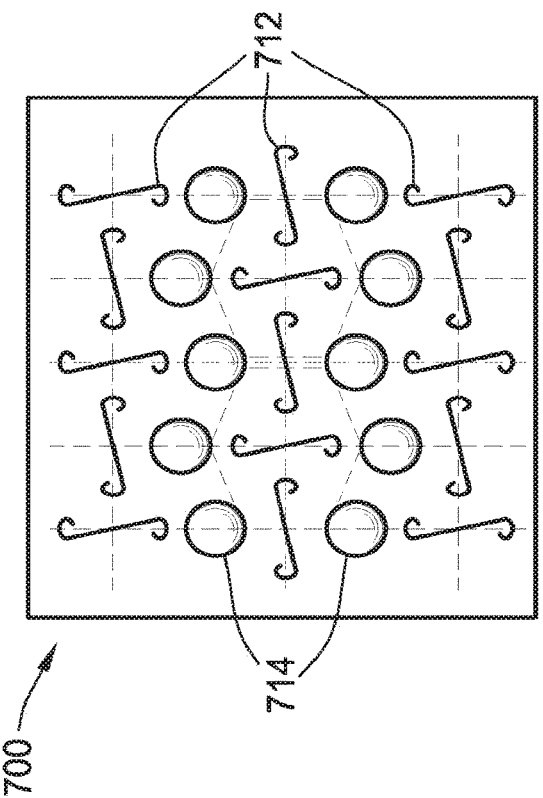
Figure 8:
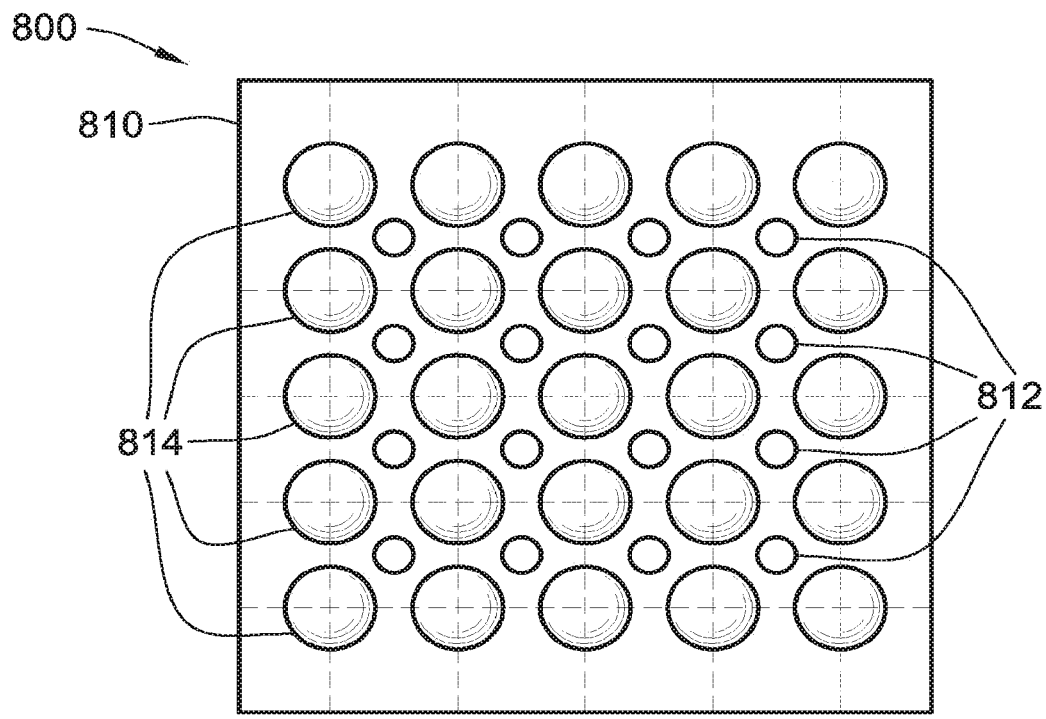
FIGS. 8 and 9 are plan-view illustrations of representative hybrid dimple-and-void auxetic structures utilizing semi-spherical protrusions and circular bore slots in accordance with aspects of the present disclosure.
Figure 9:
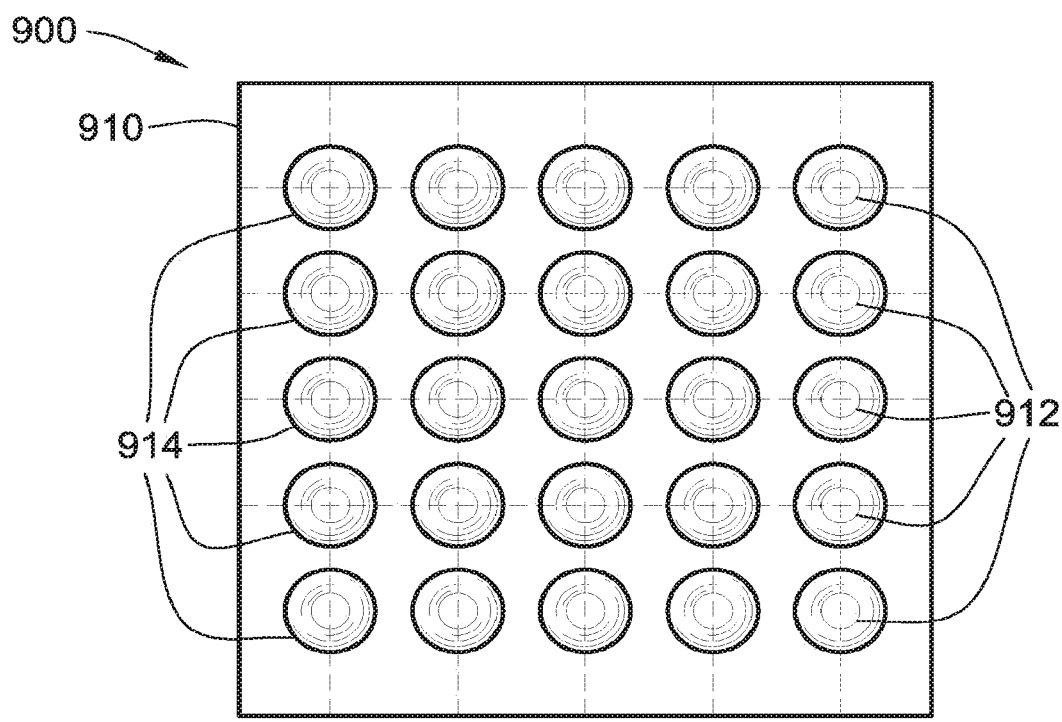

It is also within the scope and spirit of this disclosure to vary the orientation of the dimples and voids with respect to the shape and definition of the unit cell. By way of example, other potential unit cell compositions include: square unit cells where each unit cell is composed of voids at each of four apexes and a dimple in the center, as seen in FIG. 5, or dimples at each apex and a void shape in the center; hexagonal unit cells where each unit cell is composed of dimples at each of six apexes and a void shape in the center, as seen in FIG. 6, or voids at the apexes and a dimple in the center; and polygonal unit cells with a combination of voids and dimples disposed along the shape's boundary, as seen in FIG. 7. A unit cell can take on any shape that can be tessellated. Moreover, spacing between the dimples and the voids can be increased or decreased, as seen in FIG. 8, including voids occurring on the tops or sides of the dimples, as seen in FIG. 9. Alternative void shapes used in combination with alternative dimple shapes is also envisioned. Some optional void shapes include elliptical, circular, barbell-shaped, I-shaped, S-shaped and Z-shaped through slots, for example. Some optional dimple shapes include elliptical, hemispherical, semispherical, I-shaped, S-shaped, etc.

Many equations can be used to generate the dimple shapes, and an example is provided below. Here, a and b control the aspect ratio of the ellipsoid in the f(x,y)=0 plane. The dimple's depth is controlled by δ. Out of plane curvature is controlled by α and β. A single dimple can be created with:

$$f(x, y) = \exp\left(\delta\left[1 - \frac{1}{1 - \left|\frac{x}{a}\right|^\alpha - \left|\frac{y}{b}\right|^\beta}\right]\right)$$

restricted to $$\left|\frac{x}{a}\right|^\alpha + \left|\frac{y}{b}\right|^\beta < 1$$

Dimples may be a combination of inward/outward dimples or may all exit the plane in the same direction.

Any number of hybrid dimple-and-void auxetic sheets may be stacked in order to achieve a desired mechanical behavior or a desired cooling behavior, or both, and fulfill geometry requirements. Alternatively, a hybrid auxetic sheet may be combined with a flat or curved sheet or a combination of hybrid dimple void sheets and flat/curved sheets can be put together to achieve a desired behavior. Advantages of using a hybrid of porous and non-porous auxetic features, as compared to using each individually, is the ability to design for a broader range of porosities. Some non-porous auxetic structures can only target 0% porosity applications. Patterned void structures give the most benefit for stress reduction at relatively high porosities. By combining these two types of auxetic structures, the benefits for stress reduction can be realized while designing for lower porosities.

An advantageous application for any of the disclosed configuration could be in an impingement effusion cooled liner where the voids provide cooling air and the dimples increase turbulence in the flow. This application represents an improvement over the current state of the art because it can reduce component stress due to carefully designed mechanical behavior as well as improved cooling schemes. There are several possible methods of manufacturing the disclosed exemplary embodiments, such as to form the dimples by metal punching and create the voids by drilling (e.g., laser drilling). Embodiments can also be cast, such as via investment casting due to the precision achieved, or fabricated via sintering or 3D printing. For a specific application, a dimple-and-void auxetic structure can be optimized to the required porosity, the geometry, and the temperature profile of the specific component.

Figure 4:
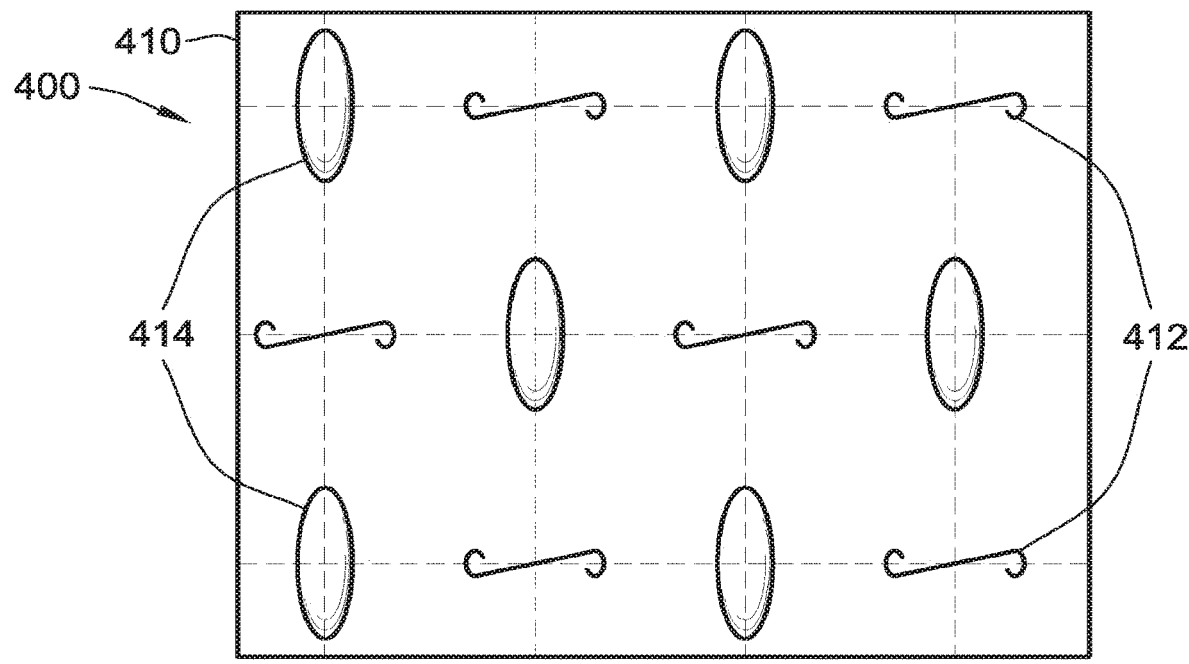

Shown in FIG. 4 is another example of a hybrid dimple-and-void auxetic structure, designated generally at 400, which utilizes an alternating pattern of elongated symmetrical protrusions and elongated asymmetrical slots. Although differing in appearance, the auxetic structure 400 may include any of the features, options, and alternatives described herein with respect to the other auxetic structures. In the same vein, unless explicitly disclaimed or logically prohibited, any of the auxetic structures disclosed herein can share features, options and alternatives with other disclosed embodiments. Similar to the auxetic structure 300 illustrated in FIG. 3, for example, the auxetic structure 400 of FIG. 4 comprises an elastically rigid body 410 (e.g., a sheet material of polycrystalline allow and/or single-crystal allow) comprising S-shaped through slots/apertures, some of which are labelled as 412, and raised elliptical protrusions/dimples, some of which are labelled 414. Similar to the configuration presented in FIG. 3, the S-shaped through slots 412 and elliptical protrusions 414 of FIG. 4 are arranged in a square array or matrix of rows and columns. Contrastingly, each row and each column comprises S-shaped through slots 412 interleaved with elliptical protrusions 414. For example, each vertically oriented dimple 414 is neighbored on four sides by horizontally oriented slots 412, while each horizontally oriented slot 412 is neighbored on four sides by vertically oriented dimples 414. With this arrangement, the minor axes of the protrusions are parallel to the rows of the array and the minor axes of the apertures are parallel to the columns of the array. Thus, the major axes of the apertures are parallel to the rows of the array while the major axes of the protrusions are parallel to the columns of the array.

FIG. 5-7 provide additional examples of hybrid dimple-and-void auxetic structures, respectively designated as 500, 600 and 700, which utilize alternating patterns of symmetrical protrusions and elongated slots. As indicated above, auxetic structures 500, 600, 700 may include any of the features, options, and alternatives described herein with respect to the other auxetic structures, such as those discussed above. These auxetic structure 500, 600, 700 each comprises an elastically rigid body 510, 610 and 710, respectively, fabricated with S-shaped through slots/apertures 512, 612, and 712, as well as raised semispherical protrusions/dimples 514, 614 and 714. In FIG. 5, the S-shaped through slots 512 and semispherical protrusions 514 are arranged in a repeating or tessellated pattern of square unit cells where each unit cell is composed of a slot 512 located at each of four corners with a protrusion 514 in the center of the four slots 512. Contrastingly, the auxetic structure 610 of FIG. 6 comprises S-shaped through slots 612 and semispherical protrusions 614 arranged in a repeating or tessellated pattern of hexagonal unit cells where each unit cell is composed of a protrusion 614 located at each of six corners with a slot 612 in the center of the six protrusions 614. FIG. 7, in comparison, employs a repeating or tessellated pattern of hexagonal unit cells wherein each cell comprises a combination of slots 712 and protrusions 714 disposed along the periphery of the cell and a slot 712 in the center of the cell.

Shown in FIGS. 8 and 9 are other examples of hybrid dimple-and-void auxetic structures, respectively designated as 800 and 900, which utilize alternating patterns of symmetrical protrusions and symmetrical apertures. Each of the auxetic structures 800, 900 comprises an elastically rigid body 810 and 910, respectively, that is fabricated with circular apertures (or "boreholes") 812 and 912, as well as raised hemispherical protrusions (or "domes" or "dimples") 814 and 914. The auxetic structure 800 of FIG. 8 is designed with the circular boreholes 812 and hemispherical dimples 814 arranged in a pattern of square unit cells where each unit cell is composed of a dimple 814 located at each of four corners with a borehole 812 in the center of the four dimples 814. Contrastingly, the auxetic structure 910 of FIG. 9 is engineered with the boreholes 912 and dimples 914 arranged in a pattern of square unit cells where each unit cell is composed of a dimple 914 located at each of four corners with a borehole 912 passing through the center of each dimple 914.

Aspects of this disclosure are also directed to methods of manufacturing and methods of using auxetic structures. By way of example, a method is presented for manufacturing an auxetic structure, such as the auxetic structures described above with respect to FIGS. 3-9. This method includes, as an inclusive yet non-exclusive set of acts: providing an elastically rigid body, such as the elastically rigid body 312 of FIG. 3; adding to the elastically rigid body a plurality of apertures, such as the elliptical slots of FIG. 2b and the elongated S-shaped slots of FIG. 3, which extend through the elastically rigid body, the apertures being arranged in an array of rows and columns; and, adding to the elastically rigid body a plurality of protrusions, such as the of FIG. 3 or the semispherical protrusions of FIG. 5, which project from the surface of the elastically rigid body, the protrusions being arranged in an array of rows and columns. The apertures are cooperatively configured with the protrusions—e.g., arranged in any of the engineered patterns depicted in FIGS. 3-9—to provide a predefined porosity while exhibiting negative Poisson's Ratio (NPR) behavior under stress or strain.

Figure 10:
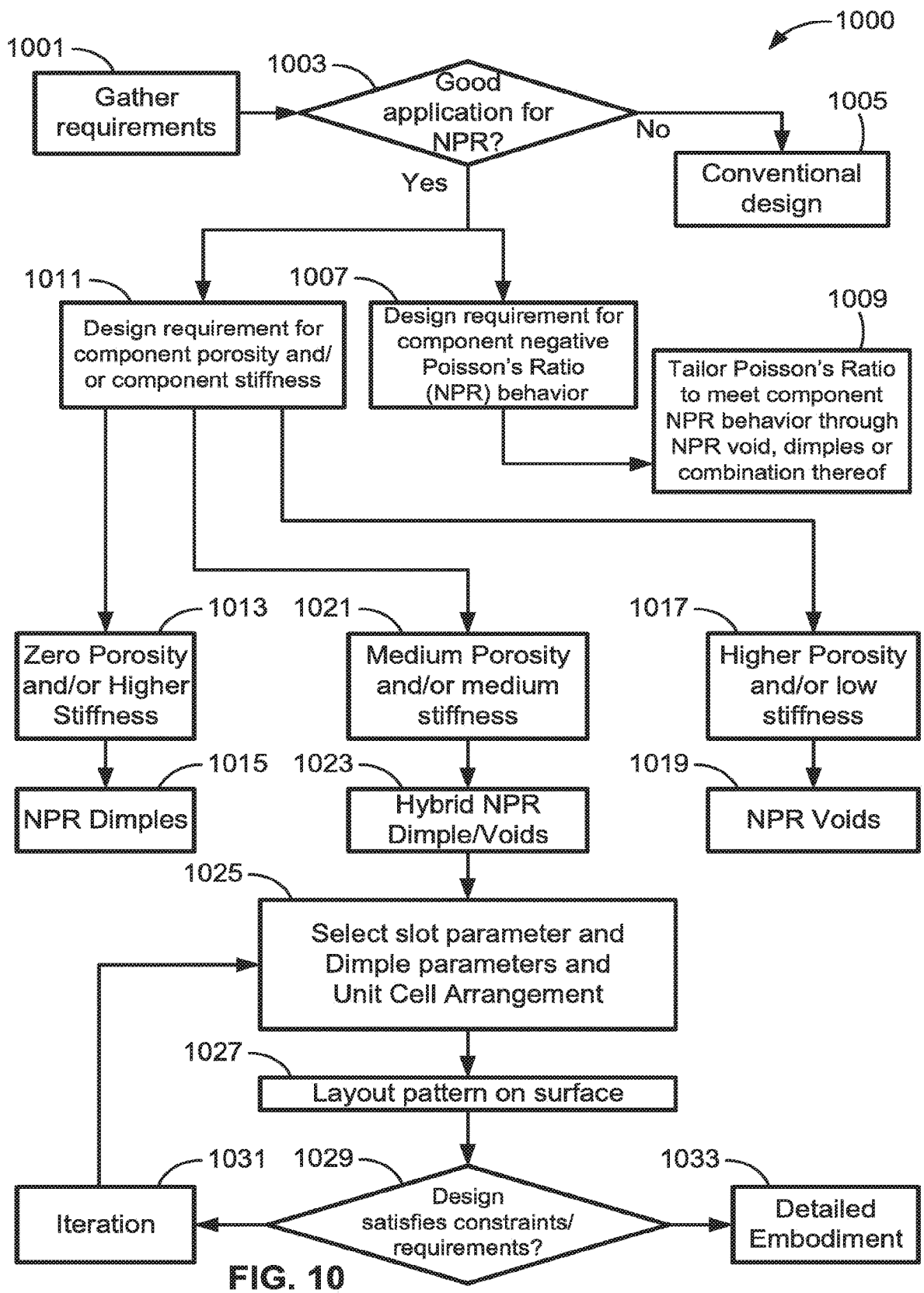
FIG. 10 is a flowchart depicting an algorithm or workflow diagram for fabricating auxetic structures in accord with aspects of the disclosed concepts.

With reference now to the flow chart of FIG. 10, an improved method of engineering and fabricating an auxetic structure is generally described at 1000 in accordance with aspects of the present disclosure. FIG. 10 can be representative of an algorithm or a workflow diagram comprising instructions that can be executed, for example, by a computer aided design (CAD) system, a finite element (FE) system (or similar) for stress and/or fluid flow calculations, and/or a computer automated manufacturing (CAM) system to perform any or all of the above or below described functions associated with the disclosed concepts. The method 1000 will be described with reference to the various aspects and features shown in FIGS. 1-9 of the drawings; such reference is being provided purely by way of explanation and clarification.

The method 1000 begins at Block 1001 with receiving design values for a set of predetermined design requirements for a desired auxetic structure application. These design requirements can include, as some non-limiting examples, external load requirements, thermal damping requirements, etc. Optionally, at Block 1003, the method 1000 then determines, from the received design values for the predetermined design requirements of a component which might benefit from the incorporation of NPR behavior, if the application is suitable for the application of available NPR structures. For instance, an application can be said to be "a suitable application for NPR" if the intended application is thermal-stress dominated, operates under displacement-controlled loading conditions, and/or has a predetermined value for the required NPR value. If it is determined that the auxetic structure application is not suitable for NPR (1003=NO), the method continues to Block 1005 where a conventional design is utilized.

If it is determined, at Block 1003, that the desired application is in fact suitable for NPR (Block 1003=YES), the method continues to Block 1007 and/or Block 1009. If the main design requirement of the application is a specific required Negative Poisson's Ratio (NPR) value for the structure, the workflow goes to Block 1007. The required NPR value can be tailored at Block 1009 by adapting slot design parameters and dimple design parameters for the auxetic structure. For example, any of the disclosed auxetic structure configurations exhibiting NPR behavior can be applied to tailor the Poisson's Ratio by adapting the aspect ratio and/or porosity of the void features (in general, higher aspect ratios and/or higher porosities imply more negative PR) or by selection of appropriate dimple characteristics (in general, more elliptical and/or less steepness implies more negative PR). Parameter studies can be employed to determine the exact behavior for a given component geometry.

If, alternatively, the main design requirement is a targeted porosity value and/or stiffness value, the workflow proceeds to Block 1011. According to the illustrated example, Block 1011 may also comprise determining, from the received design values, a required stiffness for the auxetic structure. The assessment conducted at Block 1011 may optionally require determining whether the required component porosity is high, medium or zero, and determining whether the required stiffness is high, medium or zero. If the required component porosity is zero or nearly zero and/or the required stiffness is relatively high, as indicated at Block 1013, the method will then reduce or eliminate the addition of NPR slots to the elastically rigid body of the auxetic structure such that the auxetic structure comprises predominantly or solely NPR dimples, as indicated at Block 1015. Conversely, if the required component porosity is relatively high (e.g., approximately 9.0%) and/or the required stiffness is relatively low, as indicated at Block 1017, the method will then reduce or eliminate the addition of NPR dimples to the elastically rigid body of the auxetic structure such that the auxetic structure comprises predominantly or solely NPR slots, as indicated at Block 1019. However, when it is determined that the required component porosity is medium (e.g., greater than 0% but less than 9%) and/or the required stiffness is medium, as indicated at Block 1021, the method will then add a complementary number of NPR dimples and NPR slots to the elastically rigid body, as indicated at Block 1023.

With continuing reference to FIG. 10, Block 1025 includes determining, based, at least in part, on the required NPR value and the required component porosity identified at Blocks 1007 and 1011, a slot design parameter for the NPR slots of the auxetic structure, a dimple design parameter for the NPR dimples of the auxetic structure, and a unit cell arrangement for the slots and the dimples. The slot design parameter includes, singly or in any combination, a shape of the NPR slots, a size of the NPR slots, an aspect ratio of the NPR slots, etc. In this regard, the dimple design parameter includes, singly or in any combination, a shape of the NPR dimples, a size of the NPR dimples, a depth of the NPR dimples, etc. By comparison, the unit cell arrangement includes a pattern, a spacing, a ratio, or any combination thereof, for the slots and the dimples. Some pattern design rules may require consideration that NPR behavior is achieved from rotation of the NPR slots and from into-plane displacement of the dimples. Consequently, it is desirable for at least some embodiments that the foregoing parameters be selected to control this behavior to achieve desired stress and cooling performance characteristics. Circular dimples with minimal steepness tend to have lower peak stresses than elliptical or high steepness dimples.

The method 1000 then proceeds to Block 1027 where a pattern of the selected dimples (e.g., semispherical, elliptical, etc.) and selected through slots (e.g., elliptical, S-shaped, I-shaped, etc.) is laid out on an (upper) surface of the elastically rigid body of the auxetic structure. Optionally, at Block 1029, the slot design parameter(s), dimple design parameter(s), and unit cell arrangement are then analyzed prior to the adding the slots and the dimples to the elastically rigid body. This analysis may utilize a cost model, a damping model, a cooling model and/or a stress model to determine whether any changes are required. If a modification is necessary, an iteration is run at Block 1031 and then the method 1000 returns to Block 1025. Otherwise, the method 1000 continues to Block 1033 where the selected NPR slots and dimples are added to an elastically rigid body in accordance with the determined slot design parameter(s), dimple design parameter(s) and unit cell arrangement.

In some embodiments, the method includes at least those steps enumerated above and illustrated in the drawings. It is also within the scope and spirit of the present invention to omit steps, include additional steps, and/or modify the order presented above. It should be further noted that the foregoing method can be representative of a single sequence for designing and fabricating an auxetic structure. However, it is expected that the method will be practiced in a systematic and repetitive manner.

Aspects of this disclosure can be implemented, in some embodiments, through a computer-executable program of instructions, such as program modules, generally referred to as software applications or application programs executed by a computer. The software can include, in non-limiting examples, routines, programs, objects, components, and data structures that perform particular tasks or implement particular abstract data types. The software can form an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

It should be noted that the algorithms illustrated and discussed herein as having various modules or blocks or steps that perform particular functions and interact with one another are provided purely for the sake of illustration and explanation. It should be understood that these modules are merely segregated based on their function for the sake of description and can represent computer hardware and/or executable software code which can be stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

The present invention is not limited to the precise construction and compositions disclosed herein. Rather, any and all modifications, changes, combinations, permutations and variations apparent from the foregoing descriptions are within the scope and spirit of the invention as defined in the appended claims. Moreover, the present concepts expressly include any and all combinations and subcombinations of the preceding elements and aspects.

What is claimed is:

1. An auxetic structure comprising:
   an elastically rigid body that is capable of being deformed elastically and plastically under an applied stress, the elastically rigid body having:
   a plurality of apertures extending through the elastically rigid body, the plurality of apertures being arranged in a first array of rows and columns; and
   a plurality of protrusions projecting from the elastically rigid body in a normal plane in a z direction, the plurality of protrusions being arranged in a second array of rows and columns, each of the protrusions being elongated and having a major axis perpendicular to and longer than a minor axis, the major axes being in plane in an x direction or a y direction, the minor axes of the protrusions being parallel to the rows of the second array and the major axes of the protrusions being parallel to the columns of the second array, the plurality of protrusions being interleaved with the plurality of apertures,
   wherein the plurality of apertures is cooperatively configured with the plurality of protrusions to provide a porosity while exhibiting a negative Poisson's Ratio (NPR) value in any condition and axial orientation under any macroscopic planar loading conditions in any axial orientation.

2. The auxetic structure of claim 1, wherein the protrusions include a first plurality of protrusions arranged with respective major axes parallel to the rows of the second array, and a second plurality of protrusions arranged with respective major axes parallel to the columns of the second array.

3. The auxetic structure of claim 1, wherein the protrusions are elliptical.

4. The auxetic structure of claim 1, wherein the protrusions include one or more raised protrusions and one or more recessed protrusions.

5. The auxetic structure of claim 1, wherein each of the apertures is defined through a respective one of the protrusions.

6. The auxetic structure of claim 1, wherein each of the apertures is elongated having a major axis perpendicular to a minor axis.

7. The auxetic structure of claim 6, wherein the major axes of the apertures are parallel to the rows of the first array and the minor axes of the apertures are parallel to the columns of the first array.

8. The auxetic structure of claim 6, wherein the apertures include a first plurality of apertures arranged with respective major axes parallel to the rows of the first array, and a second plurality of apertures arranged with respective major axes parallel to the columns of the first array.

9. The auxetic structure of claim 6, wherein the apertures are S-shaped through slots.

10. The auxetic structure of claim 6, wherein the elongated apertures are present in the elastically rigid body when in a stress-free state.

11. The auxetic structure of claim 6, wherein the predefined porosity provided by the elongated apertures is approximately 0.3-9%.

* * * * *